Nov. 11, 1924. 1,515,417
C. SCHERGENS
WHEEL RIM
Filed April 10, 1922 2 Sheets-Sheet 1

C. Schergens,
INVENTOR

BY Victor J. Evans.
ATTORNEY

WITNESSES:

Nov. 11, 1924.                     1,515,417
C. SCHERGENS
WHEEL RIM
Filed April 10, 1922        2 Sheets-Sheet 2

C. Schergens,
INVENTOR

Patented Nov. 11, 1924.

1,515,417

UNITED STATES PATENT OFFICE.

CHARLES SCHERGENS, OF ST. LOUIS, MISSOURI.

WHEEL RIM.

Application filed April 10, 1922. Serial No. 551,075.

*To all whom it may concern:*

Be it known that I, CHARLES SCHERGENS, a citizen of the United States, residing at St. Louis, in the county of St. Louis and State of Missouri, have invented new and useful Improvements in Wheel Rims, of which the following is a specification.

This invention relates to separable rims for automobiles and has for its object the provision of a rim which is so constructed that it may be taken apart to permit the easy removal and replacement of tires without any necessity for the employment of the usual rim expanding and contracting tools and also without any necessity for using other tools for prying the tire beads over the edges of the rim as is the case with clincher rims.

An important and more specific object is the provision of a rim which is formed of separable slidably connected sections, secured together under normal conditions but easily capable of being taken apart when a tire change is necessary.

An additional object is the provision of a device of this character which will be simple and inexpensive in manufacture, highly efficient in use, durable in service and a general improvement in the art.

With the above and other objects and advantages in view, the invention consists in the details of construction to be hereinafter more fully described and claimed, and illustrated in the accompanying drawings, in which:

Figure 1:
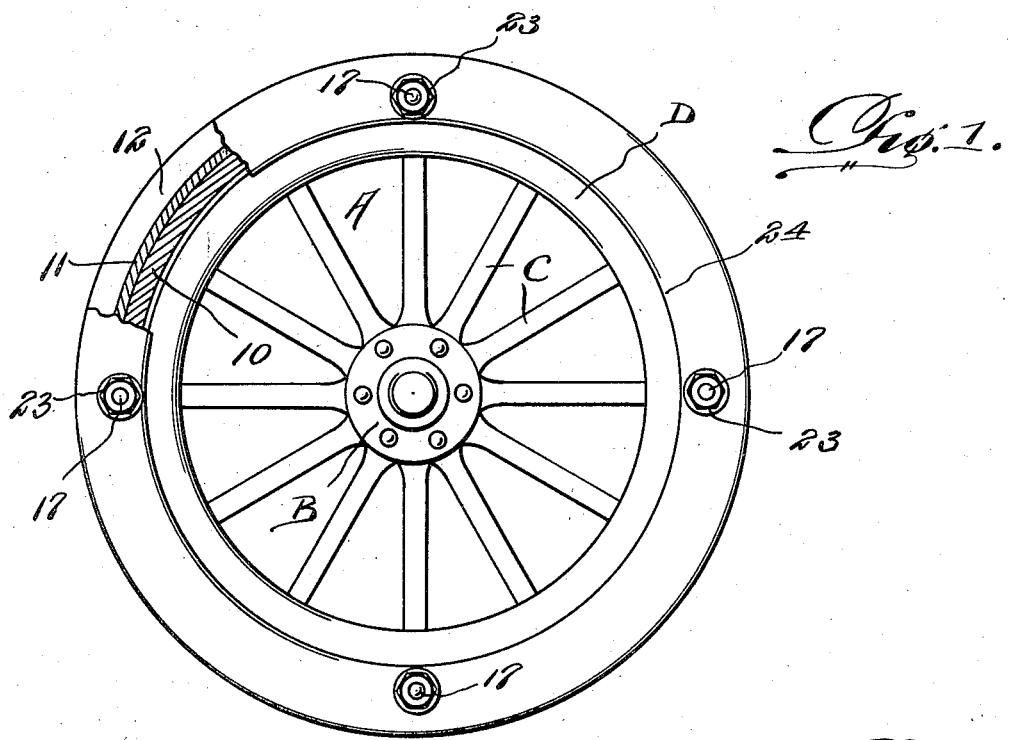
Figure 1 is a side elevation of the rim, parts being broken away and in section.
Figure 2:
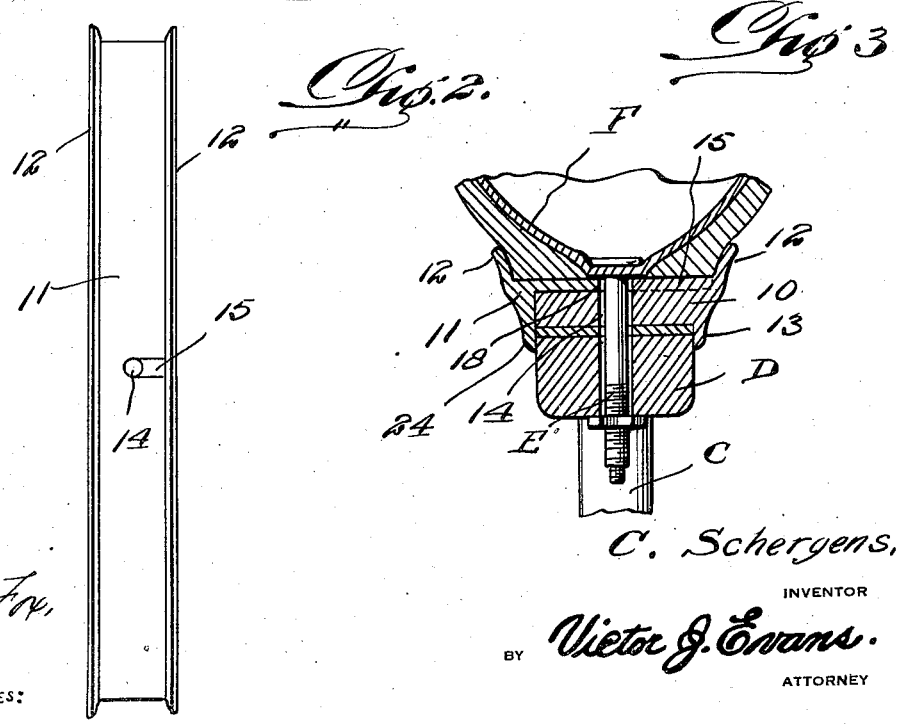
Figure 2 is an edge view looking toward the place which receives the valve stem of the tire.
Figure 3:
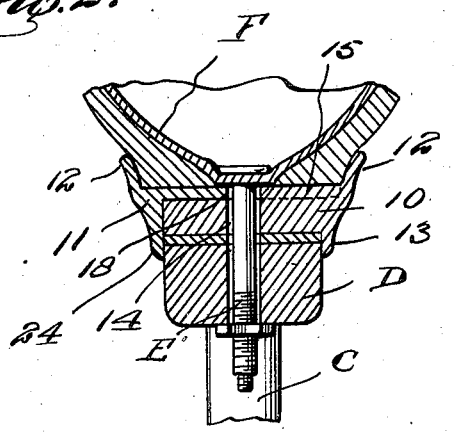
Figure 3 is a cross sectional view taken through the place provided for the valve stem.
Figure 5:
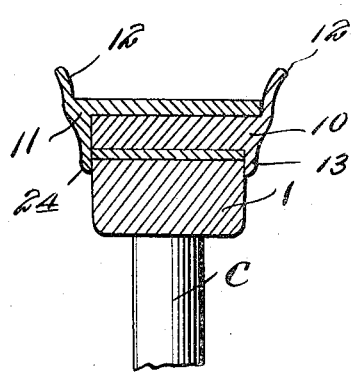
Figure 5 is a cross sectional view taken between two of the securing bolts.
Figure 4:
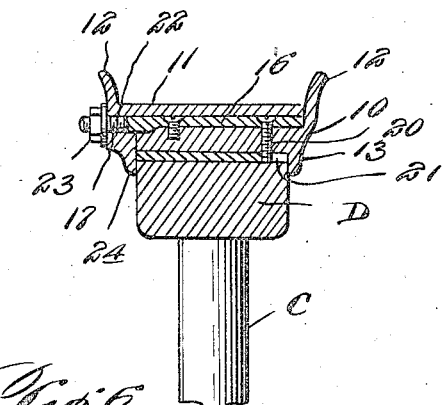
Figure 4 is a cross sectional view taken through one of the securing bolts.
Figure 6:
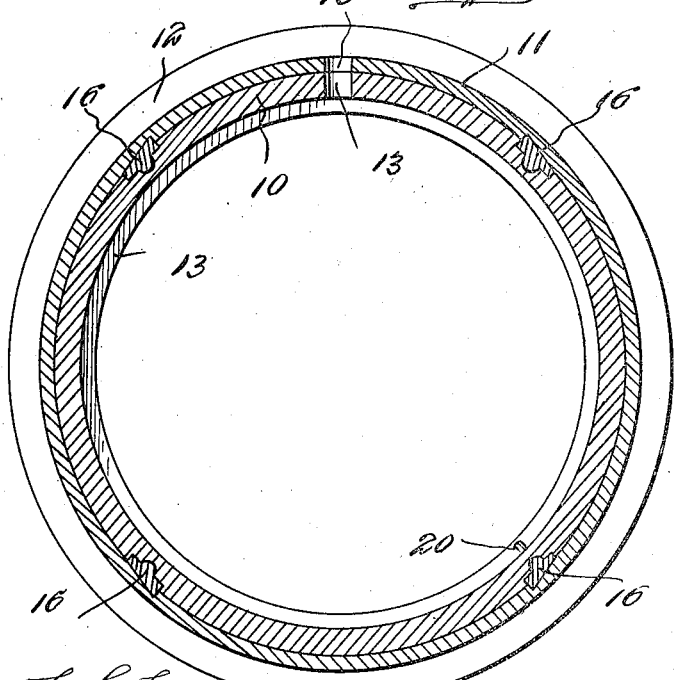
Figure 6 is an edge view of the inner rim member.
Figure 7:
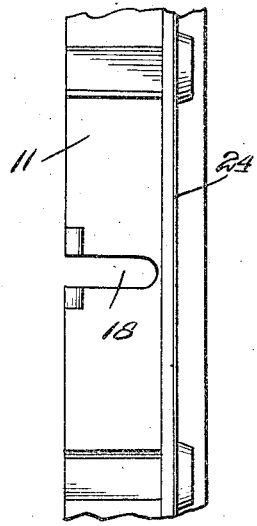
Figure 7 is a view of the interior of a portion of the outer rim.

Referring more particularly to the drawings, the letter A designates the stationary portion of the wheel, including the hub B, spokes C and felly D.

In carrying out my invention I provide a rim which consists of sections 10 and 11 which are separable and which are formed at their outer edges with tire retaining flanges 12. The section 10, which will hereinafter be described as the inner section, is so formed as to extend in encircling relation to the felly D and is provided with an inwardly extending flange 13 which engages against the felly. This section 10 is formed at a point at its periphery with a hole 14 for the passage of the valve stem E of the tire F and adjacent this hole, that is between it and the flange 12, is a projection 15 for a purpose to be described. Secured upon the periphery of the section 10 at suitably spaced intervals are metal plates 16 which terminate in threaded stems 17.

The section 11 is of a size to be received exteriorly upon the section 10 and has its periphery formed at a certain point with a slot 18 for the accommodation of the valve stem E, the open end of this slot engaging upon the projection 15 when the sections are assembled. The plates 16 on the section 10 extend somewhat beyond the periphery of the section 11 so as to maintain a driving connection between the sections and to reinforce the structure. Incidentally it might be mentioned that the section 10 has an inwardly projecting element 20 fitting within a recess 21 in the felly of the wheel, so that the rim will have a driving connection with the wheel itself. The section 11 is formed opposite the recesses 19 therein with holes 22 for the passage of the threaded stems 17 and engaging upon the projecting ends of the stems are nuts 23 which operate to clamp the sections together. The section 11 is also provided with an inwardly extending flange 24 which engages against the wheel felly and also against the edge of the section 10 when the parts are clamped together.

In the use of the rim it will be seen that when it is necessary to change a tire all that is required is to remove the nuts 23 whereupon the section 11 may be pulled away from the wheel without disturbing the section 10 if such is desired though of course the section 10 may be as readily disengaged. After the parts are separated it is of course obvious that a tire may be quickly and easily taken off or put on without any prying or without any necessity for employing expanding or contracting tools such as are necessary in the use of the well known split rim. In fact nothing is necessary but a wrench to take off and put on the nuts 23 which hold the parts together. The slot 17 registering with the hole 14 provides ample means for accommodating the valve stem of the tire without any danger of injuring it at any time. It is also to be noted that there is ample driving connection between the sections of the rim and also between the rim and the wheel so that there will be no possibility of circumferential creeping.

While I have shown and described the preferred embodiment of the invention, it is of course to be understood that I reserve the right to make such changes in the form, construction and arrangement of the parts as will not depart from the spirit of the invention or the scope of the subjoined claim.

Having thus described my invention I claim:

A separable wheel rim consisting of a pair of cylindrical rim members telescopically engaged and provided at their outer edges with tire engaging flanges and provided at their outer edges with inwardly extending flanges engageable with opposite sides of the wheel felly, plate members secured upon the outer periphery of the inner member and engageable within transverse recesses in the outer member, said plate members terminating in threaded extensions passing through holes in the second named flange of the outer member, and nuts screwed upon said threaded ends.

In testimony whereof I affix my signature.

CHARLES SCHERGENS.